Patented Oct. 20, 1931

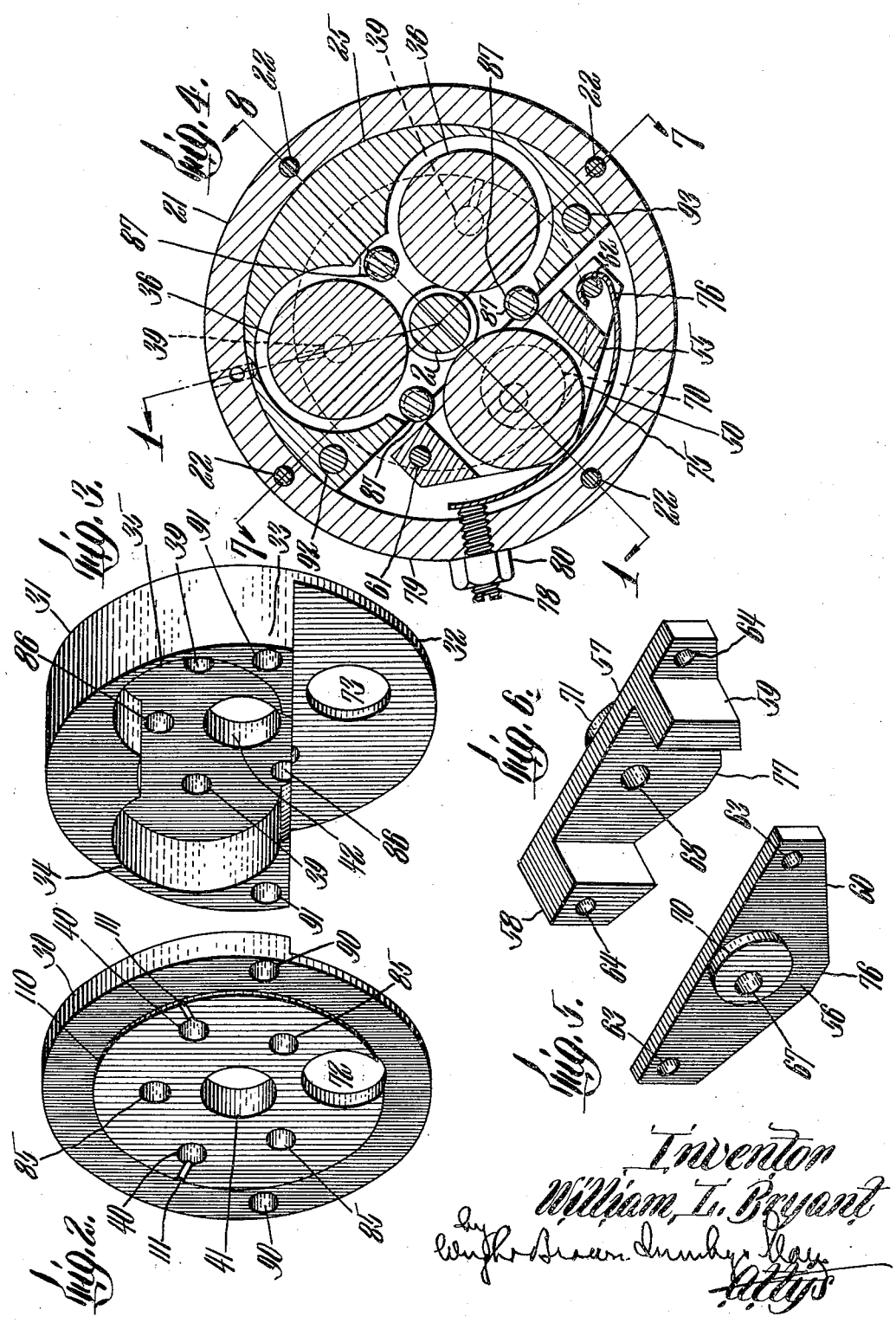

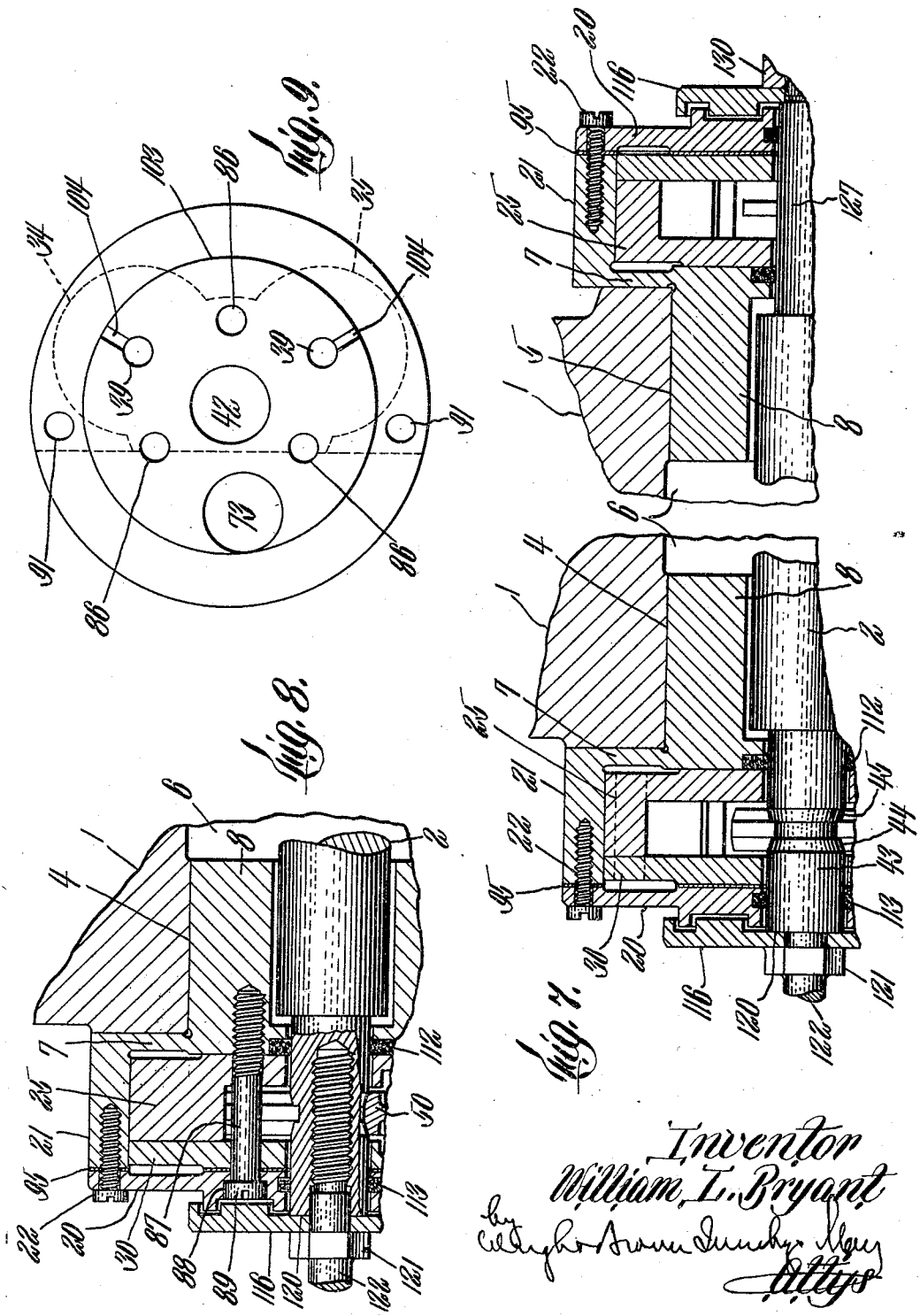

1,827,968

UNITED STATES PATENT OFFICE

WILLIAM LE ROY BRYANT, OF SPRINGFIELD, VERMONT; BLANCHE B. BRYANT, OF SPRINGFIELD, VERMONT, ADMINISTRATRIX OF SAID WILLIAM LE ROY BRYANT, DECEASED

WHEELHEAD AND THE LIKE

Application filed November 9, 1926. Serial No. 147,340.

This invention relates to bearings for high speed shafts such as wheelheads for grinding machines and the like.

Practically all high speed wheelheads heretofore made have employed ball bearings of standard design, selecting the most perfect individual bearings for this service. Even such bearings are found to be comparatively short lived when run at speeds desired when grinding small bores.

The object of the present invention is to produce a wheelhead construction capable of high speed and of greater endurance than those heretofore used. According to the present invention, therefore, roller bearings are substituted for ball bearings, the rollers being journaled on portions of small diameter compared with those portions contacting with the rotating spindle, and the portions contacting with the spindle being preferably of larger diameter than the spindle itself. By this construction the peripheral speed of the roller journal portions in their bearings is much less than the peripheral speed of the spindle, and the friction coefficient for the small diameter bearings is also less than for large diameter bearings. Where ball bearings have been used as heretofore, the balls have been of smaller diameter than the spindle, so their proper speed has been too high to be actually reached for the desired speed of the spindle. It has, therefore, been impossible with such a construction in many cases to reach the desired spindle speed.

In the present construction the spindle is the most rapidly rotating element, so that it may be run at a much higher speed than heretofore. Means may be provided by which end thrust upon the spindle may be taken up, and means for adjusting for wear both radially and axially of the spindle.

For a more complete understanding of this invention reference may be had to the accompanying drawings in which—

Figures 2 and 3 are perspective views of parts of the bearing roller cage.

Figure 4 is a section on line 4—4 of Figure 1.

Figures 5 and 6 are perspective views of an adjustable bearing roller support.

Figure 1:
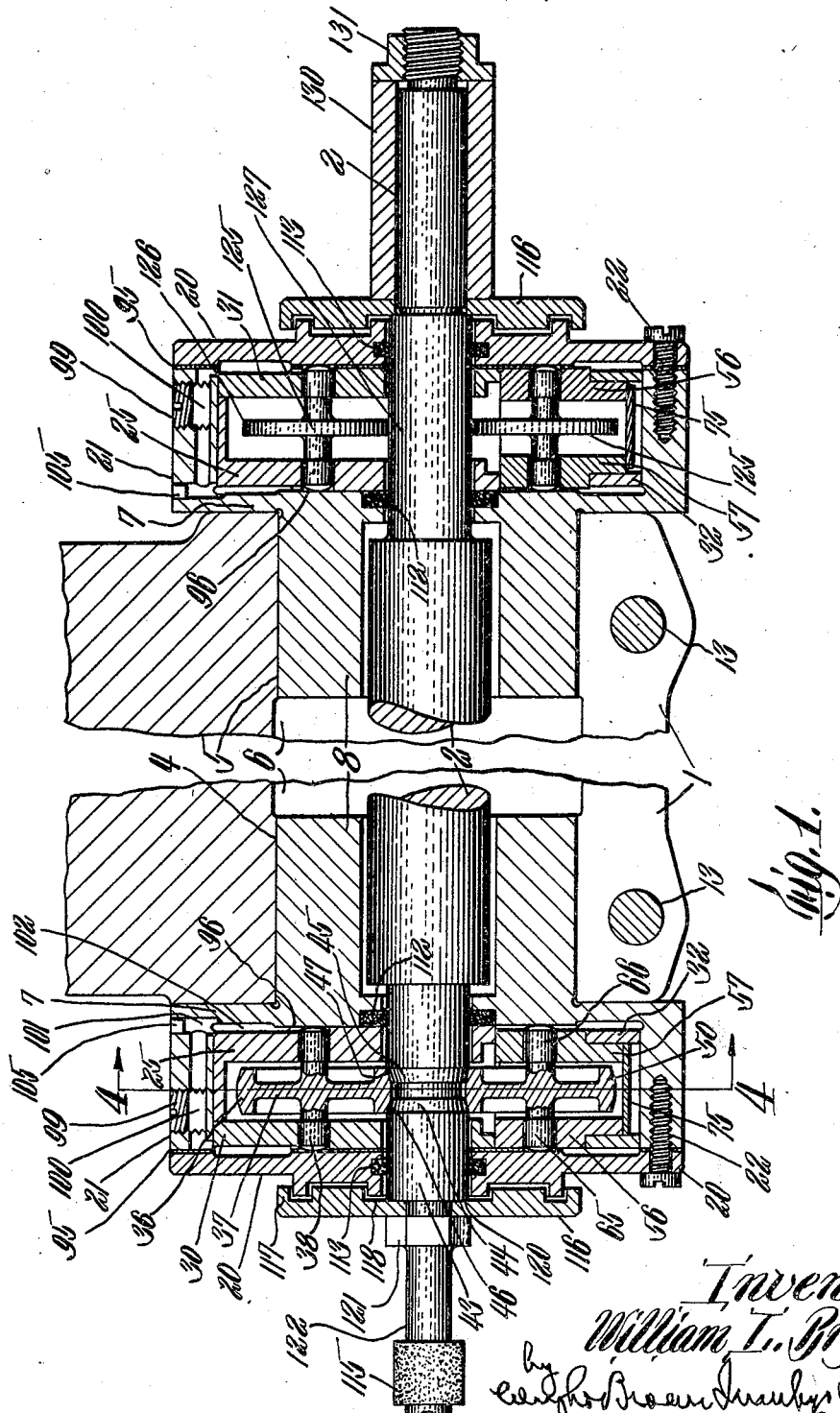
Figure 1 is a longitudinal section through the wheelhead, showing a pair of spaced bearings for the spindle.

Figures 7 and 8 are fragmentary sections on lines 7—7 and 8—8, respectively, of Figure 4.

Figure 9 is an elevation showing the outer face of member shown in perspective in Figure 3.

Referring first to Figures 1, 7 and 8, at 1 is shown a frame portion for supporting the shaft or spindle 2, this shaft or spindle being journaled in bearings 4 and 5, fitted in opposite ends of a transverse opening 6, through the frame member 1. Each of the bearings 4 and 5 comprises a two-part casing, one of these parts 7 having a hub portion 8 fitting within the bore 6. The casings are held in position in the bore 6 in any suitable manner, but as herein shown clamping bolts 13 engaging parts of the frame 1 are used for this purpose. The other part of each of the casings comprises a cover plate 20 which may be fixed to the peripheral wall 21 of the casing 7 as by means of screws 22. Within each of these casings is positioned a cage 25 carrying the bearing rollers arranged in circular array about the spindle, as will later appear. Each of these cages is formed in two parts as 30 and 31, shown detached in Figures 2 and 3 respectively. The member 31 comprises a disk portion 32 having an integral extension 33 on one face. This extension is cut away as 34 and 35 to form chambers to receive a pair of bearing rollers as 36. As these bearing rollers are preferably somewhat different in the two bearings 4 and 5, the construction for bearing 4 will first be described. As shown best in Figure 1, each of the rollers 36 has a central portion 37 of relatively large diameter, and end portions 38 of relatively small diameter. One of these end portions 38 is journaled in a perforation 39 in the cage member 31, and the other end portion is journaled in a mating perforation 40 in the member 30. Both the cage members 30 and 31 have central perforations 41 and 42 through which passes the journaled portion 43 of the spindle 2. As shown, this journal portion is provided with oppositely disposed tapered bearing faces 44 and 45 on which complementally tapered portions 46 and 47 of each of the rollers 36 bears. A third roller 50, constructed similarly to each of the rollers 36, is mounted in such a manner as to press the bearing faces 44 and 45 against the corresponding faces 46 and 47 of the rollers 36. In order to provide for wear of the bearing faces, this third roller 50 is shown as mounted for adjustment toward and from the rollers 36 and is disposed in such angular relation to these rollers about the axis of the spindle 2 as to provide a proper bearing for this spindle. As shown, this third roller is spring pressed toward the pair of rollers 36, thus to provide automatically for the taking up of wear. For this end the roller 50 is journaled in a two-part frame member 55, parts of this form member being shown detached at 56 and 57 of Figures 5 and 6. Member 57 comprises a plate having spaced block portions 58 and 59 projecting from one face thereof. The member 56 comprises a plate 60 somewhat similar to the plate portion of part 57 and the two parts are assembled together as by means of pins or bolts 61 and 62 passing through or into, making perforations 63 and 64 in the parts 56 and 57. The block portions 58 and 59 form end walls of a socket in which the large diameter portion of the roller 50 rides, the journal portions 65 and 66 of this roller being journaled in bearing openings 67 and 68 in the parts 56 and 57. The part 56 has projecting on its outer face eccentrically disposed relatively to the opening 67, a circular boss 70, and the part 57 has a similar boss 71 projecting from its outer face. The bosses 70 and 71 are concentric with each other when the frame parts are assembled. These bosses 70 and 71, when the parts are assembled, are journaled in circular openings 72 and 73 respectively of the cage parts 30 and 31. It is evident that by rotation of the frame about the axis of the bosses 70 and 71, the roller journaled in the journal openings 67 and 68, will be moved bodily since these journal openings are eccentrically disposed with relation to the bosses.

This frame carrying the roller 50 is urged in a direction to press the roller 50 against the spindle journal faces by means of a spring 75 shown best in Figure 4. This spring has an end portion 76 looped about the pin or bolt 62. Its intermediate portion bridges and presses on flattened edge faces 76 and 77 of the parts 56 and 57 and its opposite end bears against the end of an adjusting screw 78, extending through the outer wall 21 of the casing 7. A lock nut 80 is shown as threaded on the outer end of this adjusting screw in order to fix it in adjusting position. By adjusting this screw, the tension of the spring 75 which acts to press the bearing roller 50 against the spindle may be adjusted.

The cage is fixed against rotation within the casing, and for this purpose the members 30 and 31 are shown as provided with alined perforations 85 and 86 through which extend screws 87 between the rollers 36 and 50, these screws also extending through perforations 88 in the casing nut plate 20. These perforations are preferably counterbored to receive the heads 89 of the screws 87.

In order to facilitate assembly, the parts 30 and 31 are shown as provided with axially alined perforations 90 and 91 respectively, in which dowel pins 92 and 93 (see Figure 4) may be placed. These pins act to retain the part 30 in proper relation to the part 31, enclosing the rollers 36 and the adjusting frame carrying the roller 50 in position, so that the casing cover 20 may be placed over the spindle and the screws 87 then inserted.

In order to provide for end thrust of the spindle and to take up wear in this direction, it is preferable to insert shims, as shown at 95, between the cover 20 and the other portion of the casing, the roller bearing portions 38 and 65 and 66 being all of the same length and extending through their bearing perforations and engaging at their inner ends against the inner end wall 96 of the casing, and at their outer ends through perforations in the shim 95 on the cover plate 20. Due to the tapered bearing faces 44 and 45 of the spindle and mating tapered faces 46 and 47 of the rollers 36 and the corresponding faces of the roller 50, endwise movement of the spindle 2 with relation to the rollers is prevented, and by prevented axially movement of the rollers themselves, endwise movement of the shaft is prevented. Since the rollers are prevented from endwise movement by the walls of the casing, endwise movement of the shaft is also prevented. As these bearing portions of the rollers wear, thinner shims 95 may be substituted, or the shims may be entirely removed so that wear either of the journal ends or of the casing faces may be adjusted for as occasion requires.

Means are also provided for lubricating the various bearings. For this purpose the wall 21 of the casing is shown as provided with a plugged opening 99 leading to an oil passage 100 extending inwardly from outer edge of the casing and communicating with an opening 101 drilled inwardly, radially adjacent to the inner wall of the casing. This opening 101 leads into an annular passage 102 between the inner wall of the casing and the adjacent face of the member 31. This annular passage extends around a boss 103 forming concentrically with the shaft opening 42 on the inner face of the cage element 31. As shown best in Figure 9, grooves 104 extend from this annular passage through the boss 103 and open into roller journal openings 39. Oil is thus permitted to pass to the inner journals 38 of the rollers 36 and may also pass downwardly to the lower portion of the casing where it may come in contact with the bearing portions of the roller 50. The outer end of the passage 101 may be closed off as by means of a plug 105. Similarly the cage part 30 is formed with a concentric circular boss 110 through which are formed the oil grooves 111 through which oil may reach the outer journals of the rollers 36, and may find its way to the other end portion of the casing at its lower end where it may have access to the outer end of the frame carrying the roller 50. Rings of felt, or other suitable material as at 112 and 113 bear on the periphery of the bearing portion of the spindle, thus to prevent the flow of oil along the surface of the bearing portion lengthwise of the spindle.

As in the particular construction illustrated, the spindle is designed to carry one or more grinding wheels, such as that shown at 115, it is preferable to place a guard 116 to prevent access of abradent particles to the interior of the bearing. As shown, this guard comprises a disk having annular ribs 117 and 118 on its inner face cooperating with mating annular portions on the outer face of the plate 20, so as to provide a tortuous passage to the shaft bearing portions. As shown in Figure 8 the plate 116 is pressed against one end of the spindle by means of a shoulder 121 carried by a spindle section arranged in axial alinement with the spindle and 122 having its inner end threaded and engaging a mating threaded opening in the spindle 2, the spindle section being of smaller diameter than the end of the spindle adjacent thereto and the plate 116 being carried on this portion of the spindle section.

The bearing 5 may be constructed similarly to the bearing 4, except that it is usually unnecessary to provide for the taking up of axial thrust of the spindle in this bearing. For this reason the bearing rollers shown at 125 are provided with cylindrical bearing faces 126 which engage a mating cylindrical portion 127 on the spindle. The guard 116 for this bearing is shown as held in position by a sleeve 130 which may serve as a driving pulley held on the spindle 2 by means of the nut 131 threaded on its end.

Preferably the large diameter portions of the various bearing rollers are of larger diameter than the mating portions of the spindle, as shown these portions being substantially double the diameter of the spindle. Thus the rate of rotation of the bearing rollers is less than that of the spindle; in the embodiment shown being only one half; and since the journal diameters of the rollers are very much smaller than their bearing diameters, the peripheral speed of the bearing portions is again further reduced. Thus the highest velocity member in the combination is the spindle itself. It is evident that very much higher speed may be given to the spindle if other parts are not required to rotate at a higher velocity than the spindle.

An embodiment of the invention having thus been described, it should be evident to those skilled in the art that various changes and modifications might be made without departing from the spirit or scope of the invention as defined by the appended claims.

I claim:

1. A device of the class described, comprising a cage, a pair of rollers having small diameter portions journaled in said cage, a member carried by said cage and adjustable toward and from the journals of said pair of rollers, a roller having small diameter portions journaled in said member, each of said rollers having a large diameter portion, and a shaft extending between said rollers and bearing on the large diameter portions thereof.

2. A device of the class described, comprising a cage, a pair of rollers having small diameter portions journaled in said cage, a member carried by said cage and adjustable toward and from the journals of said pair of rollers, a roller having small diameter portions journaled in said member, each of said rollers having a large diameter portion, and means for resiliently pressing said member toward said shaft to take up wear.

3. A device of the class described, comprising a stationary cage, a pair of rollers having portions of small diameter journaled in said cage, a member rockably supported by said cage, a third roller having a portion of small diameter journaled in said member eccentrically to the pivot of said member, said rollers having portions of large diameters, a shaft extending between said rollers and bearing on their large diameter portions, and a spring acting to turn said member about its pivot in a direction to swing its roller toward said shaft.

4. A device of the class described, comprising a casing, a two-part cage fixed within said casing, a pair of rollers having portions of small diameter journaled in both parts of said cage, a member pivoted between said cage parts, a roller having portions of small diameter journaled in said member, a shaft extending through said casing and cage and journaled on the portions of large diameter of said rollers, a leaf spring having one end bearing on said member tending to rock said member to press its roller toward said shaft, and means accessible from without said casing for adjusting the pressure exerted by said spring.

In testimony whereof I have affixed my signature.

WILLIAM LE ROY BRYANT.